United States Patent
Tojima et al.

(10) Patent No.: US 8,978,851 B2
(45) Date of Patent: Mar. 17, 2015

(54) SELF-PROPELLED CABLE RELAY TRUCK

(75) Inventors: Masanori Tojima, Fujisawa (JP); Koji Takeda, Tama (JP); Kouichi Yamashita, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/110,774

(22) PCT Filed: May 9, 2012

(86) PCT No.: PCT/JP2012/061825
§ 371 (c)(1),
(2), (4) Date: Oct. 9, 2013

(87) PCT Pub. No.: WO2012/153754
PCT Pub. Date: Nov. 15, 2012

(65) Prior Publication Data
US 2014/0027228 A1    Jan. 30, 2014

(30) Foreign Application Priority Data

May 10, 2011   (JP) .................................. 2011-105747

(51) Int. Cl.
*H02G 11/02* (2006.01)
*E02F 9/20* (2006.01)
*B60L 9/00* (2006.01)

(52) U.S. Cl.
CPC ................ *H02G 11/02* (2013.01); *E02F 9/207* (2013.01); *B60L 9/00* (2013.01); *E02F 9/2016* (2013.01); *E02F 9/2095* (2013.01)
USPC .................................. 191/12.2 A; 191/12.2 R

(58) Field of Classification Search
CPC .................. E02F 9/00; H02G 11/02
USPC .......................................... 191/12.2 A, 12.2 R
See application file for complete search history.

(56) References Cited

U.S. PATENT DOCUMENTS

| | | | |
|---|---|---|---|
| 2007/0096538 A1* | 5/2007 | Niemi et al. | 299/1.05 |
| 2009/0127928 A1* | 5/2009 | Udagawa et al. | 303/113.2 |
| 2010/0084916 A1* | 4/2010 | Kumar et al. | 307/9.1 |
| 2011/0030574 A1* | 2/2011 | Kitanaka | 105/49 |
| 2011/0043038 A1* | 2/2011 | Tsutsumi et al. | 307/48 |

(Continued)

FOREIGN PATENT DOCUMENTS

| | | |
|---|---|---|
| CN | 201125399 Y | 10/2008 |
| CN | 102021921 A | 4/2011 |

(Continued)

OTHER PUBLICATIONS

International Search Report dated Aug. 14, 2012, issued for PCT/JP2012/061825 and English translation thereof.

*Primary Examiner* — Jason C Smith
(74) *Attorney, Agent, or Firm* — Locke Lord LLP

(57) ABSTRACT

A self-propelled cable relay truck includes: a power transmission relay unit to which a power supply side cable configured to perform power transmission between a power supply and the relay truck, and a work machine side cable configured to perform power transmission between an electric work machine and the relay truck are connected to perform relay of the power transmission between the power supply side cable and the work machine side cable; a travel device configured to perform traveling operation so as to be able to move the power transmission relay unit; and a movement control unit configured to perform movement control of the travel device.

6 Claims, 6 Drawing Sheets

(56) References Cited

U.S. PATENT DOCUMENTS

| | | | |
|---|---|---|---|
| 2013/0282211 A1* | 10/2013 | Ruth et al. | 701/22 |
| 2014/0027228 A1* | 1/2014 | Tojima et al. | 191/12.2 A |
| 2014/0032006 A1* | 1/2014 | Tojima et al. | 700/295 |
| 2014/0033699 A1* | 2/2014 | Udagawa et al. | 60/422 |
| 2014/0069758 A1* | 3/2014 | Tojima et al. | 191/12.2 R |
| 2014/0179154 A1* | 6/2014 | Crowe | 439/501 |

FOREIGN PATENT DOCUMENTS

| | | |
|---|---|---|
| JP | 54-125801 A | 9/1979 |
| JP | 58-133102 A | 8/1983 |
| JP | 07-018705 A | 1/1995 |
| JP | 2003-278159 A | 10/2003 |
| JP | 2009-114653 A | 5/2009 |
| JP | 2010-142050 A | 6/2010 |

* cited by examiner

SELF-PROPELLED CABLE RELAY TRUCK

FIELD

The present invention relates to a self-propelled cable relay truck.

BACKGROUND

In recent years, from the viewpoint of reduction of fuel consumption and environmental protection, among work machines such as an excavator, there has been electric drive-type work machine driven by electricity. In such an electric drive-type work machine, electricity supplied to a power source includes an internal power supply type in which a battery is mounted on the work machine to receive electricity from the battery, and an external power supply type that receives electricity from the outside of the work machine by a cable. For example, a mobile equipment cable processing device described in Patent Literature 1 has a towing vehicle connected to the power supply by a cable, and the mobile equipment is connected to the power supply via the towing vehicle, further by being connected to the towing vehicle by the cable. Furthermore, in an electric drive-type construction machine described in Patent Literature 2, an electric motor mounted on an excavator is connected to a power supply by the cable, via an electric power standardization device mounted on a movable truck.

Furthermore, in a power supply system of an electric drive-type work machine described in Patent Literature 3, a power generator is mounted on a dump truck, and an excavator including a hydraulic pump driven by an AC motor connects the AC motor of the excavator and the power generator of the dump truck by a cable, or connects the AC motor of the excavator and the power generator via a transformer mounted on a movable truck. In this way, in the case in which an electric work machine such as an excavator is driven by an external power supply, it is possible to widen the range of movement of the work machine itself, by connecting the work machine and the power supply by a cable via the movable truck.

CITATION LIST

Patent Literature

Patent Literature 1: Unexamined Japanese Patent Application Publication No. 58-133102
Patent Literature 2: Unexamined Japanese Patent Application Publication No. 2009-114653
Patent Literature 3: Unexamined Japanese Patent Application Publication No. 2010-142050

SUMMARY

Technical Problem

However, when the electric work machine is moved in a state in which a power supply or a truck supplied with electricity from the power supply and the electric work machine are connected by a cable, there is a case in which tension acts on the cable, which may cause cutting of the cable. In addition, it is also conceivable that the electric work machine itself travels on the cable, and the cable may be damaged. For this reason, in the case of moving the electric work machine to which the cable is connected, it is necessary to move the work machine so as not to damage the cable. In particular, in many cases, large machines are used in a mining machine or the like, and thus the electric power required to operate the machines also increases. In this case, the diameter of the used cable becomes thicker, and the weight of the cable also becomes heavier. For this reason, it is important to move the electric work machine so as not to damage the cable, but it has been very difficult to change the arrangement position of the cable so as to avoid the damage.

The invention has been made in view of the above circumstances, and an object of the invention is to provide a self-propelled cable relay truck capable of preventing the damage to the cable.

Solution To Problem

To overcome the problems and achieve the object, according to the present invention, a self-propelled cable relay truck comprises: a power transmission relay unit to which a power supply side cable configured to perform power transmission between a power supply and the relay truck, and a work machine side cable configured to perform power transmission between an electric work machine and the relay truck are connected to perform relay of the power transmission between the power supply side cable and the work machine side cable; a travel device configured to perform traveling operation so as to be able to move the power transmission relay unit; and a movement control unit configured to perform movement control of the travel device.

According to the present invention, the self-propelled cable relay truck further comprises: an external state detection unit configured to detect a surrounding state; and a movement position derivation unit configured to derive a movement position based on a position of the electric work machine, wherein the movement position derivation unit is configured to derive the movement position based on a position of the electric work machine detected by the external state detection unit, and the movement control unit is configured to perform the movement control so as to move to the movement position derived by the movement position derivation unit.

According to the present invention, the self-propelled cable relay truck further comprises: a control receiver configured to receive a control signal from an outside, wherein the movement control unit is configured to perform the movement control based on the control signal received by the control receiver.

According to the present invention, the self-propelled cable relay truck further comprises: a position detector configured to detect a current position; and a positional information receiver configured to receive position information of the electric work machine transmitted from a transmitter provided in the electric work machine, wherein the movement control unit is configured to perform the movement control based on the position information of the electric work machine received by the positional information receiver and the current position detected by the position detector.

According to the present invention, the travel device is configured to perform traveling operation by electricity supplied from the power supply with the power supply side cable.

According to the present invention, the self-propelled cable relay truck further comprises: a winding device configured to be capable of winding a cable, wherein at least one of the power supply side cable and the work machine side cable is wound by the winding device in an insertable and drawable manner.

The self-propelled cable relay truck according to the invention has an effect that is capable of preventing the damage to the cable.

BRIEF DESCRIPTION OF DRAWINGS

FIG. 5-1 is an explanatory view illustrating the operation of the relay truck in the case in which the excavator moves.

FIG. 5-2 is an explanatory view illustrating the operation of the relay truck in the case in which the excavator moves.

FIG. 5-3 is an explanatory view illustrating the operation of the relay truck in the case in which the excavator moves.

FIG. 5-4 is an explanatory view illustrating the operation of the relay truck in the case in which the excavator moves.

DESCRIPTION OF EMBODIMENTS

Herein below, embodiments of a self-propelled cable relay truck according to the invention will be described in detail with reference to the drawings. In addition, the invention is not limited by the embodiments. In addition, constituent elements in the embodiment to be described below include elements replaceable and easily replaced by those skilled in the art or substantially the same elements.

[Embodiment]

Figure 1:
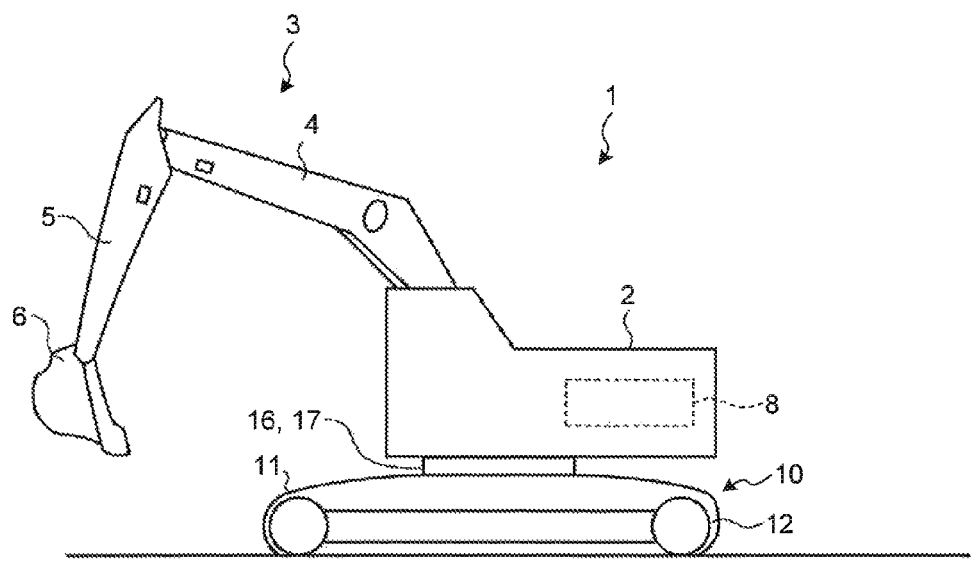
FIG. 1. is a schematic view of an excavator supplied with electricity via a relay truck according to an embodiment.

FIG. 1 is a schematic view of a loading machine (for example, excavator) supplied with electricity via a relay truck according to the embodiment. An excavator 1 illustrated in FIG. 1 is an electric work machine that drives the respective units by the electric power supplied from the outside. The excavator 1 has an upper swing body 2 and a lower traveling body 10, and the upper swing body 2 and the lower traveling body 10 are connected to each other by a swing circle 16 that connects the upper swing body 2 and the lower traveling body 10 so as to make the both bodies relatively rotate. Among them, a work machine 3 serving as a working device including a boom 4, an arm 5 and a bucket 6 is attached to the upper swing body 2. Furthermore, the lower traveling body 10 has a pair of left and right crawler belts 11, and a pair of left and right travel motors 12 that drive the crawler belt 11 by being driven by electric power. The excavator 1 is able to travel by driving the crawler belt 11 by the travel motor 12.

Furthermore, the swing circle 16 is provided with an electric swing motor 17, and the swing circle 16 relatively rotates the upper swing body 2 with respect to the lower traveling body 10, by driving the electric swing motor 17 by electric power.

Furthermore, the upper swing body 2 is provided with a pump unit 8 that includes a hydraulic pump (not illustrated) configured to generate a hydraulic pressure, and a hydraulic pressure generating electric motor (not illustrated) configured to drive the hydraulic pump by being driven by electric power. The hydraulic pressure generated in the pump unit 8 by driving the hydraulic pressure generating electric motor with electric power is applied to a hydraulic cylinder for the boom 4, a hydraulic cylinder for the arm 5, and a hydraulic cylinder for the bucket 6 via the control valve, respectively, and the hydraulic cylinders expand and contract. Accordingly, the work machine 3 provided in the upper swing body 2 performs each operation.

In addition, as in the case of swinging the upper swing body 2 or in the case of driving the actuator 3, an electric portion of the electric work machine may drive portions other than a portion related to traveling by electric power, or only the swing of the upper swing body 2 is electrically driven, thus a part of the portion to be operated by electric power does not matter.

Furthermore, the excavator 1 is a remote-controlled excavator 1 configured to perform the operation by remote operation from the outside by a driver without boarding. That is, a transceiver (not illustrated) used for the transmission and reception of radio waves at the time of performing the remote operation by radio waves is mounted on the excavator 1, and the remote operation is performed by the use of a remote controller that is provided outside the excavator 1 to perform the transmission and reception of signals between the remote controller and the transceiver of the excavator 1. The remote controller is able to perform the input of the operation instruction at the time of operating the excavator 1, the transmission of the input instruction signal, and the reception of the signal from the excavator 1 side, and is able to transmit information from the excavator 1 side to a driver who drives the excavator 1 using the remote controller.

Figure 2:
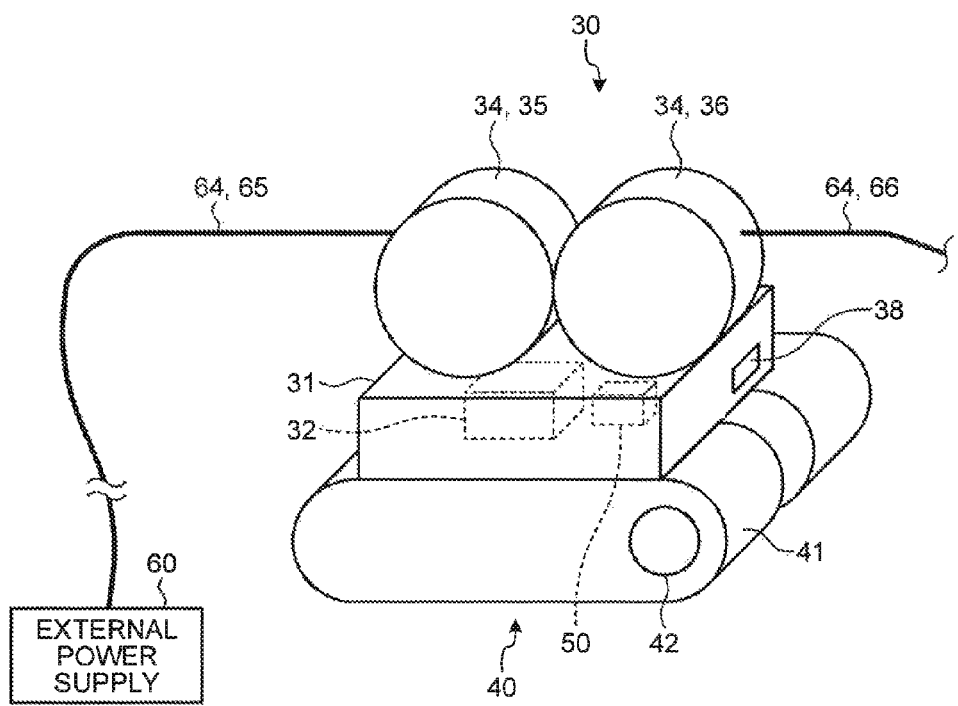
FIG. 2 is a schematic diagram of the relay truck according to the embodiment.

FIG. 2 is a schematic view of the relay truck according to the embodiment. A relay truck 30 illustrated in FIG. 2 is a self-propelled relay truck that is used for the relay of the cable connected to the excavator 1, and is capable of being self-propelled. A travel device 40 is connected to a truck main body 31 which holds a power transmission relay unit 32, to which a cable 64 for performing the power transmission is connected, and on which a cable drum 34 serving as a winding device capable of performing winding and unwinding of the cable 64 is mounted. Accordingly, the relay truck 30 is provided in a self-propellable manner. Among them, the cable drum 34 mounted on the truck main body 31 has a power supply side drum 35 that performs winding and unwinding of a power supply side cable 65, and an excavator side drum 36 that performs winding and unwinding of an excavator side cable 66.

Figure 10:
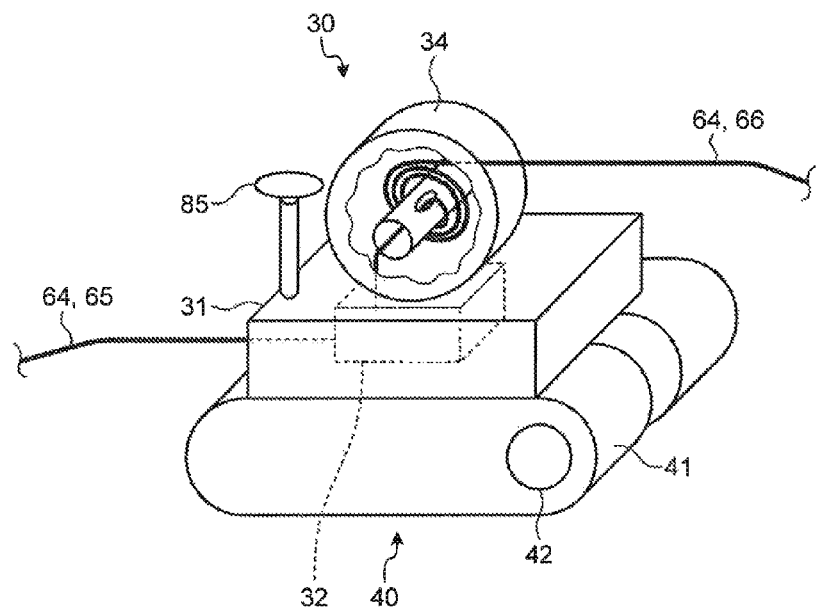
FIG. 10 is an explanatory view illustrating a modified example of the relay truck according to an embodiment.

The power supply side drum 35 and the excavator side drum 36 have a so-called shaft unit formed in a substantially cylindrical shape with a hollow inner side, and an opening port through which an inner portion of the shaft unit and the outside communicate with each other is formed on a part of the shaft unit (see FIG. 10). Furthermore, the power supply side drum 35 and the excavator side drum 36 are provided with a guide unit that restricts a winding range in an axial direction of the shaft unit in the case of winding the cable 64 around the cable drum 34. The guide unit is formed in a substantially disc-shape, and is provided near both ends of the shaft unit in a direction in which a central axis of the disc coincides with a central axis of the shaft unit. One end of each of the power supply side cable 65 and the excavator side cable 66 wound around the cable drum 34 enters the inside of the shaft unit from the opening port of the shaft unit, and the cable drum 34 is capable of winding the cable 64 on an outer circumferential surface of the shaft unit.

In the power supply side cable 65 and the excavator side cable 66, end portions of the sides, which enter the inside of the shaft unit of the cable drum 34, come out of the shaft unit from the end portion of the shaft unit, and are connected together to the power transmission relay unit 32 held by the truck main body 31. Thus, the power transmission relay unit 32, by which the power supply side cable 65 and the excavator side cable 66 are connected, is able to perform the relay of the power transmission between both cables 64.

In addition, the power transmission relay unit 32 may be a device that simply performs only the electrical relay between the power supply side cable 65 and the excavator side cable 66, or a control unit configured to perform each control of the relay truck 30 may also serve as the power transmission relay unit 32.

Furthermore, an electric motor (not illustrated) driven by electrical power is connected to the power supply side drum 35 and the excavator side drum 36. For this reason, by driving the electric motor, the power supply side drum 35 and the excavator side drum 36 are disposed so as to be rotatable around a cylindrical rotational axis, and thus the power supply side drum 35 and the excavator side drum 36 are capable of performing winding and unwinding of the power supply side cable 65 and the excavator side cable 66.

In addition, the power supply side drum 35 and the excavator side drum 36 capable of performing winding and unwinding of the cable 64 are disposed in a direction in which the rotational axes are perpendicular to an advancing direction during traveling of the relay truck 30, and in a state in which the rotational axes are aligned parallel to the advancing direction.

Furthermore, in the power supply side cable 65 which performs winding or the like around the power supply side drum 35, an opposite end portion thereof to the end portion of the side connected to the power transmission relay unit 32 is the cable 64 that is connected to an external power supply 60 serving as a power supply of electric power to be supplied to the excavator 1 to perform the power transmission between the cable 65 and the external power supply 60. Further, in the excavator side cable 66 which performs winding or the like around the excavator side drum 36, an opposite end portion thereof to the end portion of the side connected to the power transmission relay unit 32 is the cable 64 that is connected to the excavator 1 to perform the transmission between the excavator side cable 66 and the excavator 1.

Furthermore, the travel device 40 has a pair of left and right crawler belts 41, and a pair of left and right travel motors 42 that drive the crawler belts 41 by being driven by electric power. The travel device 40 performs the traveling operation by driving the crawler belts 41 by the travel motors 42. Since the travel device 40 is connected to the truck main body 31, in other words, since the travel device 40 is provided integrally with the power transmission relay unit 32, the relay truck 30 having the power transmission relay unit 32, to which the cable 64 is connected, is able to travel, by driving the travel motors 42 to cause the travel device 40 to perform the traveling operation. In addition, although the travel device 40 is preferably a crawler belt type using such a crawler belt 41, the travel device 40 may be configured by a form by the use of a tire other than the crawler belt type.

Furthermore, although the relay truck 30 is provided in a travelable manner in this way, when viewed from the relay truck 30, the power supply side cable 65 and the excavator side cable 66 extend toward the opposite directions to each other in the traveling direction of the relay truck 30. That is, the power supply side cable 65 and the excavator side cable 66 are connected to the relay truck 30 from the opposite direction sides to each other in the traveling direction of the relay truck 30.

Furthermore, the relay truck 30 is provided with a camera 38 as an external state detection unit to detect the ambient state, The camera 38 is provided on the side of the truck main body 31 in which the excavator side cable 66 extends, and by taking a photograph of the state of the direction in which the excavator side cable 66 extends, the camera 38 is able to detect the state of this direction.

The camera 38 provided in this manner is mounted on the relay truck 30 and is connected to an electronic control device 50 that controls each part of the relay truck 30. The cable drum 34 and the travel motor 42 included in the travel device 40 are also connected to the electronic control device 50.

Figure 3:
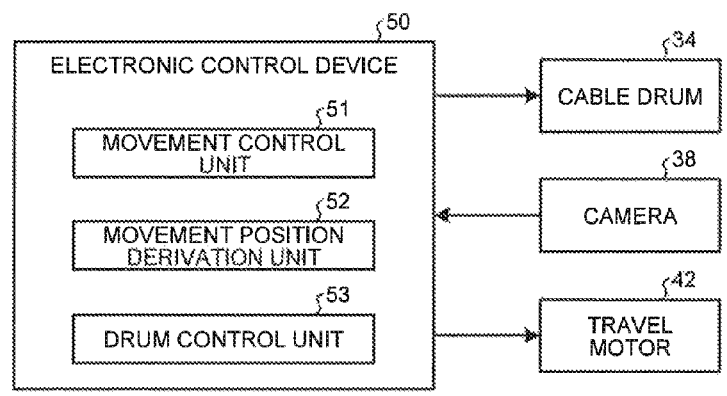
FIG. 3 is a block diagram illustrating a configuration of principal parts of the relay truck illustrated in FIG. 2.

FIG. 3 is a configuration view illustrating principal parts of the relay truck illustrated in FIG. 2. The electronic control device 50 is provided with a processing unit having a CPU (Central Processing Unit) or the like, a storage unit such as RAM (Random Access Memory), and an input-output unit, and these units are connected to one other and are able to exchange the signals with each other. The processing unit of the electronic control device 50 provided in this manner includes a movement control unit 51 as a movement control unit to perform movement control of the travel device 40, a movement position derivation unit 52 as a movement position derivation unit to derive the movement position of the relay truck 30 based on the position of the excavator 1, and a drum control unit 53 that performs the control of winding and unwinding of the cable 64 using the cable drum 34. The electronic control device 50 provided in this manner is able to control each unit, by performing the transmission of the signal among the camera 38, the cable drum 34, the travel motor 42 and the like.

Figure 4:
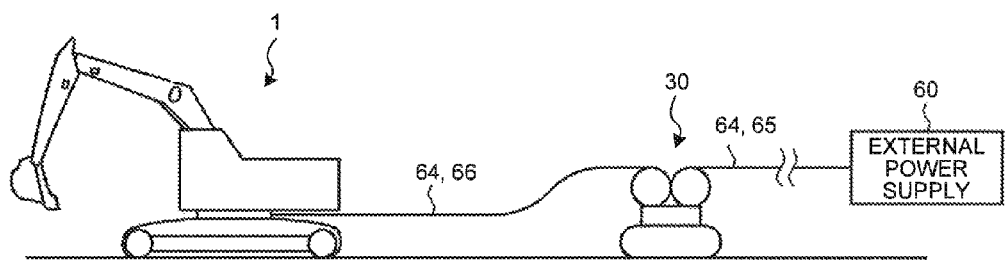
FIG. 4 is an explanatory view illustrating a state in which the relay truck and an excavator are connected to each other by a cable.

The relay truck 30 according to the embodiment is configured as described above, and the operation thereof will be described below. FIG. 4 is an explanatory view illustrating a state in which the relay truck and the excavator are connected to each other by the cable. When the relay truck 30 is used, the power supply side cable 65 is connected to the external power supply 60, and the excavator side cable 66 is used in the state of being connected to the excavator 1. Among them, for example, the excavator side cable 66 is used in the state of being connected to the lower traveling body 10 of the excavator 1. That is, since the excavator 1 is provided as an electric work machine that is driven by electric power supplied from the outside, when the excavator 1 is operated, the operation is performed by electric power supplied to the excavator 1 via the relay truck 30. Specifically, since the power supply side cable 65 is connected to the power transmission relay unit 32, and the excavator side cable 66 is also connected to the power transmission relay unit 32, when the excavator 1 is operated, the operation is performed by electric power, by supplying electric power, which is supplied from the external power supply 60 and controlled by the power transmission relay unit 32, to the excavator 1 via the excavator side cable 66.

For example, since the excavator 1 can be operated by the remote operation, when the boom 4, the bucket 6 and the like are actuated by the remote operation, the pump unit 8 is actuated by electric power supplied via the relay truck 30 to actuate the hydraulic cylinder or the like based on the instruction signal transmitted to the excavator 1 side by the remote operation device. Thus, a certain operation is performed on the excavator 1 from a position away from the excavator 1 to execute works such as excavation.

Furthermore, in the case of swinging the upper swing body 2 by the remote operation, the electric swing motor 17 is driven by electric power supplied via the relay truck 30, based on the instruction signal transmitted to the excavator 1 side by the remote operation device. Thus, the upper swing body 2 is swung relatively with respect to the lower traveling body 10.

Furthermore, since the excavator 1 is able to travel by driving the lower traveling body 10, the excavator 1 is moved to a certain position by the remote operation. Even in this case, as in the case of operating the bucket 6 or the like, the travel motor 12 is operated by electric power supplied via the relay truck 30, based on the instruction signal transmitted to the excavator 1 side by the remote operation device. At that time, since a pair of left and right travel motors 12 are provided, by independently operating the left and right travel motors 12, it is possible to perform a certain driving control including the traveling direction.

Although the excavator 1 is able to travel by actuating the travel motor 12 in this way, the excavator 1 and the relay truck 30 are connected to each other by the excavator side cable 66. For this reason, although it is also necessary to move the relay truck 30, the relay truck 30 can be made self-propelled. Therefore, when the excavator 1 travels, the relay truck 30 is also caused to travel. In this case, the relay truck 30 also automatically travels according to the movement state of the excavator 1.

In this manner, in the case in which the relay truck 30 travels, for the relay truck 30, the camera 38 takes a picture of the outside of the relay truck 30 and the relay truck 30 travels while detecting surrounding states. Specifically, since the camera 38 is provided on the side of the relay truck 30 in which the excavator side cable 66 extends, and is able to take an image of this direction, the camera 38 takes a picture of the excavator 1 located on the side in which the excavator side cable 66 extends. In this manner, the image information photographed by the camera 38 is transmitted to the electronic control device 50, and the electronic control device 50 obtains the relative position of the excavator 1 with respect to the relay truck 30 based on the image information. In the case in which the relay truck 30 is caused to travel according to the movement state of the excavator 1, a position to which the relay truck 30 is moved is derived also in consideration of the position of the cable 64 associated with the movement between the excavator 1 and the relay truck 30, while maintaining the relative distance between the relay truck 30 and the excavator 1 at a predetermined distance by the relative position of the excavator 1. In the case in which the relay truck 30 is caused to travel when the excavator 1 is moved, the relay truck 30 is caused to travel so that the relay truck 30 moves to the derived position in this way.

Figures 1, 5:
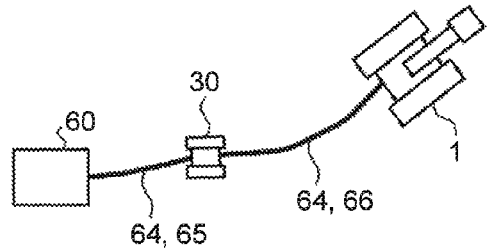
Figures 2, 5:
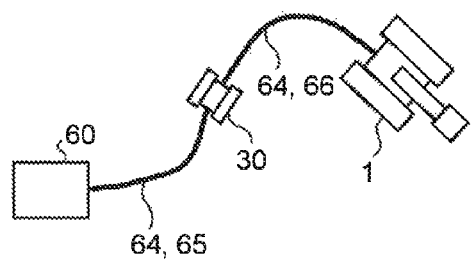
Figures 3, 5:
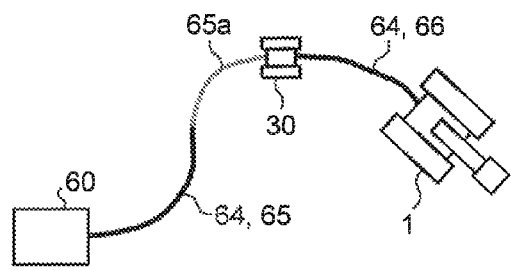
Figures 4, 5:
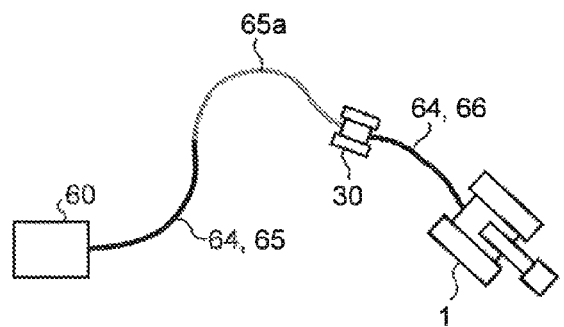

FIGS. 5-1 to 5-4 are explanatory views illustrating the operation of the relay truck in the case in which an excavator moves. When the excavator 1 moves, although the relay truck 30 is also moved according to the movement state, next, the state of the relay truck 30 at the time of the movement of the excavator 1 will be described in order. In the case of operating the excavator 1 driven by electric power, in order to supply electric power from the external power supply 60 to the excavator 1 via the relay truck 30, the relay truck 30 is electrically connected to the external power supply 60 by the power supply side cable 65. Furthermore, the relay truck 30 and the excavator 1 are also electrically connected to each other by the excavator side cable 66 at a predetermined distance (FIG. 5-1). Thus, since electric power from the external power supply 60 can be supplied to the excavator 1 via the relay truck 30, the excavator 1 is driven by electric power to execute the works such as excavation.

In the case in which the excavator 1 travels to start movement from this state, the relay truck 30 obtains the relative position of the excavator 1 by the movement position derivation unit 52 of the electronic control device 50 based on the images photographed by the camera 38. That is, based on the position of the excavator 1 which is detected by being photographed by the camera 38, the position of the relay truck 30 is derived by the movement position derivation unit 52. Furthermore, in the case in which the movement position of the relay truck 30 is derived in this way, the movement position is derived also in consideration of the position of the cable 64 as well as the relative position between the relay truck 30 and the excavator 1. That is, when the excavator 1 moves, the position of the cable 64 whose position varies with the movement of the excavator 1 is also estimated by the movement position derivation unit 52.

In this manner, after estimating the position of the cable 64, the movement position of the relay truck 30 also including the position of the cable 64 is derived, and the movement control is performed by the movement control unit 51 of the electronic control device 50 so as to move to the movement position of the relay truck 30 derived by the movement position derivation unit 52. That is, by controlling the travel motor 42 of the travel device 40 using the movement control unit 51, the relay truck 30 is caused to travel. In this case, as in the case of driving the travel motor 12 of the excavator as electric power for actuating the travel motor 42, electric power supplied from the external power supply 60 is used. That is, the travel device 40 performs the traveling operation using electricity supplied from the external power supply 60 by the power supply side cable 65.

At that time, a pair of left and right travel motors 42 are provided, and the pair of left and right travel motors 42 can be driven independently. For this reason, by adjusting the driving force generated by left and right travel motors 42, the advancing direction during travel of the relay truck 30 can be set to a certain direction, By adjusting the driving force generated by the left and right travel motors 42 in this way, the movement control unit 51 moves the relay truck 30 to a certain direction. Specifically, the movement control unit 51 controls the travel motor 42 to move the relay truck 30, so as not to step on the cable 64 at the position estimated by the movement position derivation unit 52, while maintaining the relative distance between the excavator 1 and the relay truck 30 (FIG. 5-2).

In the case in which the excavator 1 moves, although the relay truck 30 is also moved in this way, since the relay truck 30 is moved so as to maintain the relative distance between the excavator 1 and the relay truck 30, there is a case in which the distance between the relay truck 30 and the external power supply 60 increases. For this reason, in the case in which the distance between the relay truck 30 and the external power supply 60 increases, there is a case in which the length of the power supply side cable 65 is insufficient for the distance. For that reason, in the case in which the distance between the relay truck 30 and the external power supply 60 increases, the power supply side drum 35 is controlled by the drum control unit 53 of the electronic control device 50, and the power supply side cable 65 wound around the power supply side drum 35 is unwound as illustrated as a unwinding unit 65a. Thus, the relay truck 30 is caused to follow the excavator 1, while maintaining the positional relation between the excavator 1 and the relay truck 30 (FIG. 5-3).

In the case in which the excavator 1 continues to move in a direction away from the external power supply 60, the relay truck 30 is moved so as to follow the excavator 1, by driving the travel motor 42, while unwinding the power supply side cable 65 as illustrated as the unwinding unit 65a by controlling the power supply side drum 35 in this manner (FIG. 5-4). Thus, the relay truck 30 interposed between the excavator 1 and the external power supply 60 is automatically controlled according to the movement of the excavator 1.

Figure 6:
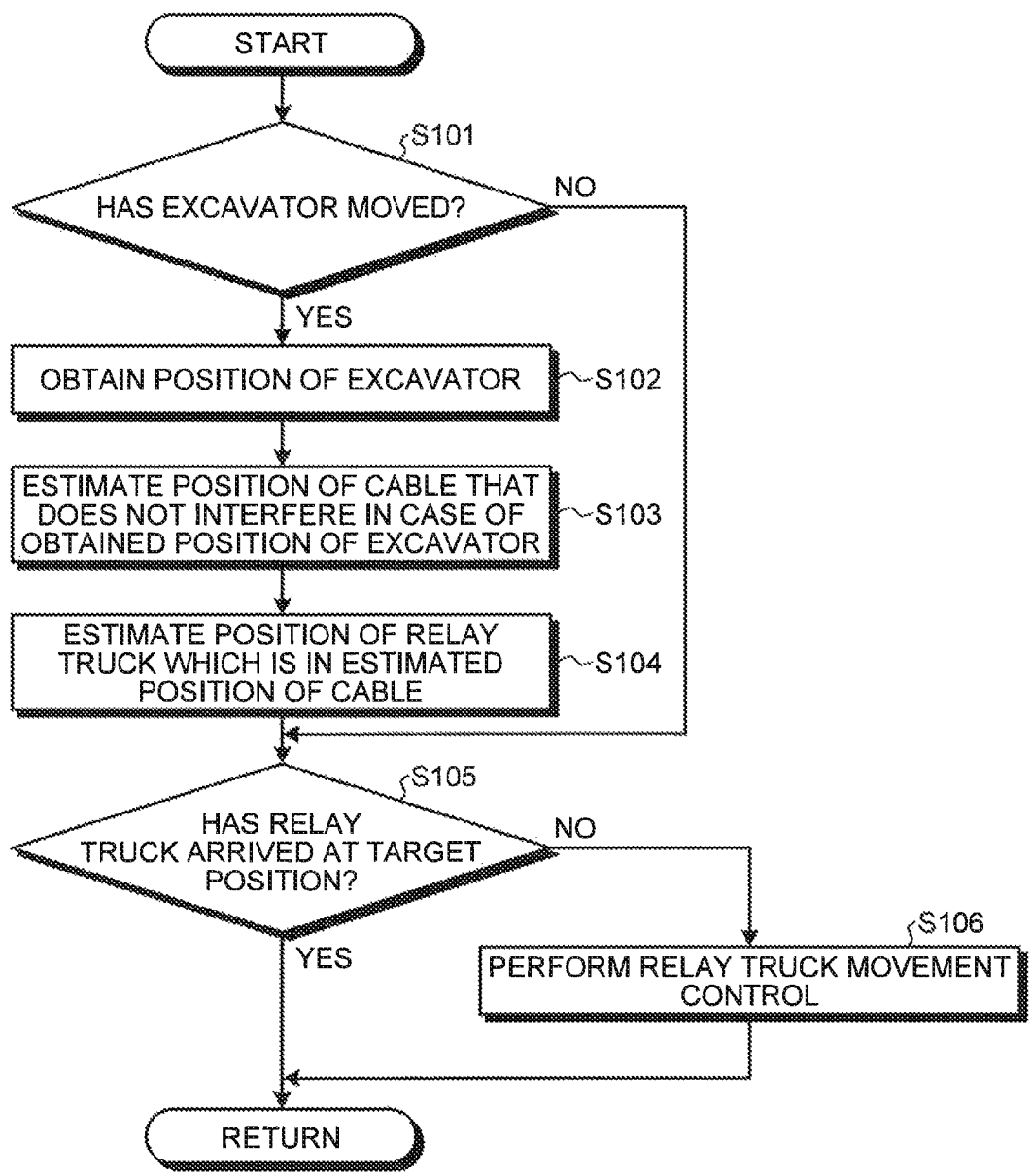
FIG. 6 is a flowchart illustrating an outline of a processing procedure in the case in which the relay truck is moved.

FIG. 6 is a flow chart illustrating an outline of the processing procedure in the case of moving the relay truck. Next, a control method of the relay truck 30 according to the embodiment, i.e., an outline of the processing procedure in the case of moving the relay truck 30 will be described. In addition, when each unit is controlled during the use of the relay truck 30, the following process is called and executed for each predetermined period of time. In the processing procedure in the case of moving the relay truck 30 according to the embodiment, first, it is determined whether the excavator 1 has moved (step ST101). This determination is performed by the movement position derivation unit 52, based on the photographing result photographed by the camera 38 included in the relay truck 30.

In the case in which it is determined that the excavator 1 has moved by the determination (Yes in step ST101), i.e., in the case in which there is a change in the image of the excavator 1 photographed by the camera 38, it is determined that the excavator 1 has moved, and next, the position of the excavator 1 is obtained (step ST102). That is, based on the photograph result taken by the camera 38, the relative position of the excavator 1 with respect to the relay truck 30 is derived and obtained by the movement position derivation unit 52.

Next, the position of the cable 64 which does not interfere in the case of the obtained position of the excavator 1 is estimated (step ST103). In other words, the positions of the excavator side cable 66 and the power supply side cable 65, which do not interfere with the works such as excavation of the excavator 1 and the movement of the excavator 1, are estimated by the movement position derivation unit 52, based on the current position of the cable 64 and the operating state of the excavator 1.

Next, the position of the relay truck 30, which is the estimated position of the cable 64, is estimated (step ST104). That is, when the movement position of the relay truck 30 is derived by the movement position derivation unit 52 based on the position of the excavator 1, the movement position of the relay truck 30, which is the estimated position of the cable 64, is estimated by the movement position derivation unit 52 also in consideration of the movement of the cable 64 due to the movement of the relay truck 30.

Next, it is determined whether the relay truck 30 has arrived at a target position (step ST105). This determination is performed by the movement control unit 51 that performs the movement control, of the relay truck 30. That is, in the case in which the excavator 1 has moved, by performing the traveling operation of the travel device 40 using the movement control unit 51, the relay truck 30 is moved to the movement position of the relay truck 30 derived by the movement position derivation unit 52, that is, the target position of the relay truck 30, but it is determined whether the relay truck 30 has arrived at the target position by the movement control unit 51.

This determination is also executed not only a case (step ST104) in which the position of the relay truck 30 which is the estimated position of the cable 64 is estimated, but in the case (No in step ST101) in which the determination as to whether the excavator 1 moves is performed and it is determined that the excavator 1 does not move. That is, even in the case in which the moved excavator 1 has stopped, since there is a case in which the relay truck 30 has not arrived at the target position immediately after this stop, in consideration of such a case, in the case in which it is determined that the excavator 1 does not move, the determination as to whether the relay truck 30 has arrived at the target position is performed (step ST105).

in the case (Yes in step ST105) in which it is determined that the relay truck 30 has arrived at the target position by this determination, the process exits the processing procedure. In contrast, in the case (No in step ST105) in which the relay truck 30 has not arrived at the target position, the travel device 40 is controlled by the movement control unit 51 to perform the movement control of making the relay truck 30 close to the target position (step ST106). After the movement control is performed, the process exits the processing procedure, and in the case in which this processing is called again, the process is executed from step ST101.

The relay truck 30 according to the embodiment described above is provided with a power transmission relay unit 32 by which the power supply side cable 65 and the excavator side cable 66 are connected to each other, and the travel device 40 that performs the traveling operation so as to be able to move the power transmission relay unit 32. Furthermore, since the travel device 40 is able to perform the movement, control by the movement control unit 51 included in the electronic control device 50, in the case in which the traveling operation is performed on the travel device 40 by the movement control unit 51, the power transmission relay unit 32 to which the cable 64 is connected also integrally moves. Thus, by performing the suitable operation of the travel device 40 by the movement control unit 51, the tension of the cable 64 can be prevented from becoming too larger at the time of movement of the excavator 1, or it is possible to set the position of the cable 64 to a position that is hard to step on by the excavator 1. As a result, is possible to prevent the damage to the cable 64.

Furthermore, the electronic control device 50 has the movement position derivation unit 52 that derives the movement position based on the position of the excavator 1, and the movement control unit 51 performs the movement control of the travel device 40 so as to move to the movement position derived by the movement position derivation unit 52. For this reason, in the case in which the excavator 1 has moved, the traveling operation corresponding to the movement of the excavator 1 can be performed on the travel device 40, and thus, it is possible to more reliably prevent the tension of the cable 64 from becoming larger or prevent the cable 64 from being stepped on by the excavator 1 when the excavator 1 moves. As a result, the damage to the cable 64 can be more reliably prevented.

Furthermore, the truck main body 31 includes the camera 38 for detecting the surrounding states by taking an photograph thereof, and since the movement position derivation unit 52 derives the movement position based on the position of the excavator 1 detected by the camera 38, in the case in which the movement control is performed on the travel device 40, the travel device 40 can be moved to a more suitable position. For this reason, in the case in which the excavator 1 has moved, it is possible to more reliably move the travel device 40 to a position in which the tension of the cable 64 can be prevented from becoming larger or the cable 64 can be prevented from being stepped on by the excavator 1. As a result, it is possible to more reliably prevent the damage to the cable 64.

Furthermore, since the travel device 40 performs the traveling operation using electricity supplied from the external power supply 60 by the power supply side cable 65, the electric power is easily supplied to, for example, a traveling electric motor via the power transmission relay unit 32 to which the cable 64 is connected. Thus, there is no need to separately prepare a separate power source such as an internal combustion engine, and it is possible to suppress the increase in weight and size of the relay truck 30.

Furthermore, since the cable 64 particularly used for a mining machine is thick and heavy, in the case in which the truck configured to relay the cable 64 is provided, the truck tends to increasing in size, and in this case, moving the thick and heavy truck becomes a difficult work in addition, since the road is also unpaved in such a mine, traveling becomes more difficult. In contrast, the relay truck 30 according to the embodiment is a self-propelled type, it is possible to easily move the relay truck 30 configured to relay the thick and heavy cables 64. In the case in which the travel device 40 is a crawler belt type, the travel device 40 is able to easily move even on the unpaved road. As a result, it is possible to improve usability of the truck in the case of relaying the thick and heavy cables 64 by the truck.

Furthermore, since the relay truck 30 can be self-propelled, when the excavator 1 is moved in accordance with the progress of the works such as excavation, it is possible to eliminate the need for the work of temporarily suspending the work and moving the position of the relay truck 30. As a result, it is possible to improve productivity of a site using the excavator 1 or the like.

Incidentally, in the above-mentioned relay truck 30, on the basis of the relative position of the excavator 1 obtained based on the image information photographed by the camera 38, the movement position of the relay truck 30 is derived and the movement control of the travel device 40 is performed, but the movement control may be performed by a method other than this method.

Figure 7:
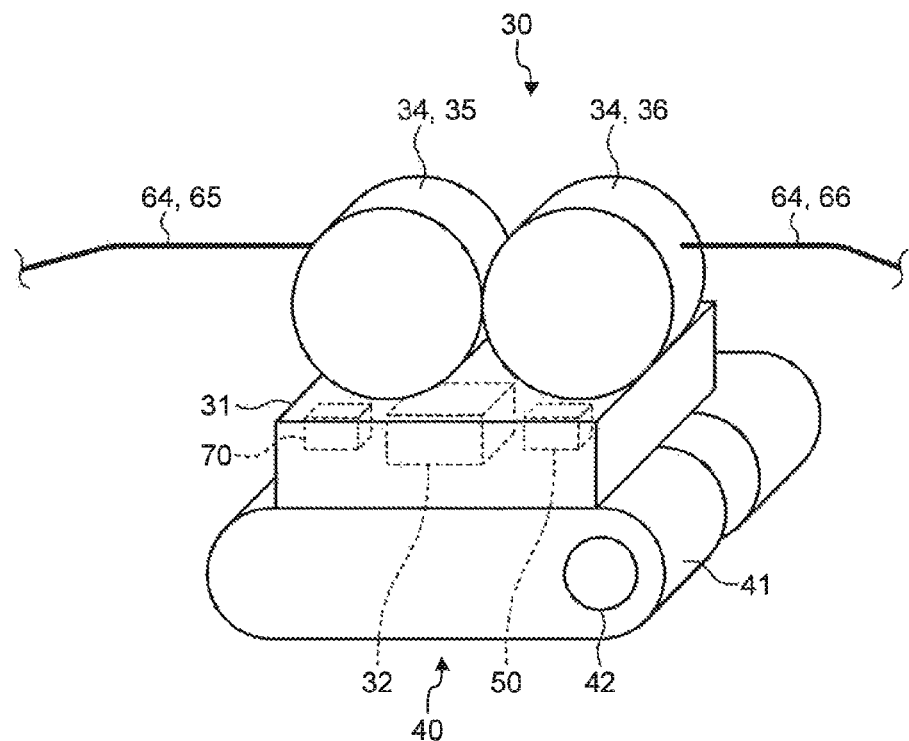
FIG. 7 is an explanatory view illustrating a modified example of the relay truck according to an embodiment.

FIG. 7 is an explanatory view illustrating a modified example of a relay truck according to an embodiment. In the case in which the movement control of the relay truck 30 is performed, the movement control may be performed by the remote control from the outside, and, for example, as illustrated in FIG. 7, the relay truck 30 may be provided with a control receiver 70 that receives a control signal from the outside. Since the excavator 1 is provided to be able to perform the operation by the remote operation from the outside, the control receiver 70 may be provided in the relay truck 30 to enable the relay truck 30 to perform the remote operation similarly to the excavator 1. In this case, the movement control unit 51 performs the movement control of the travel device 40, based on the control signal received by the control receiver 70. Thus, the relay truck 30 can be more reliably moved as desired, and it is possible to suppress the tension of the cable 6 from becoming too larger or suppress the cable 64 from being stepped on by the excavator 1 at the time of movement of the excavator 1. As a result, it is possible to more reliably prevent the damage to the cable 64.

In addition, in the case in which the relay truck 30 is moved by the remote operation in this way, it is preferable that a driver who performs the remote operation of the excavator 1 may also perform the remote operation of the relay truck 30. Since a driver of the excavator 1 knows the movement prediction of the excavator 1, the same driver also perform the remote operation of the relay truck 30, thus it is possible to more reliably and suitably perform the movement control of the relay truck 30. Furthermore, in the case in which the remote operation of the relay truck 30 is performed in this way, the control signal may be directly transmitted to the control receiver 70 of the relay truck 30 from the remote operation device, and the control signal may be transmitted via a base station that manages the states of a plurality of work machines. Furthermore, in the excavator 1, instead of the form that performs the operation by the remote operation, an operator serving as a driver of the excavator 1 may board the excavator 1 to perform the driving operation personally, and the relay truck 30 may be set to operate by an operator of the excavator 1 or the remote operation from the outside of the excavator 1.

Figure 8:
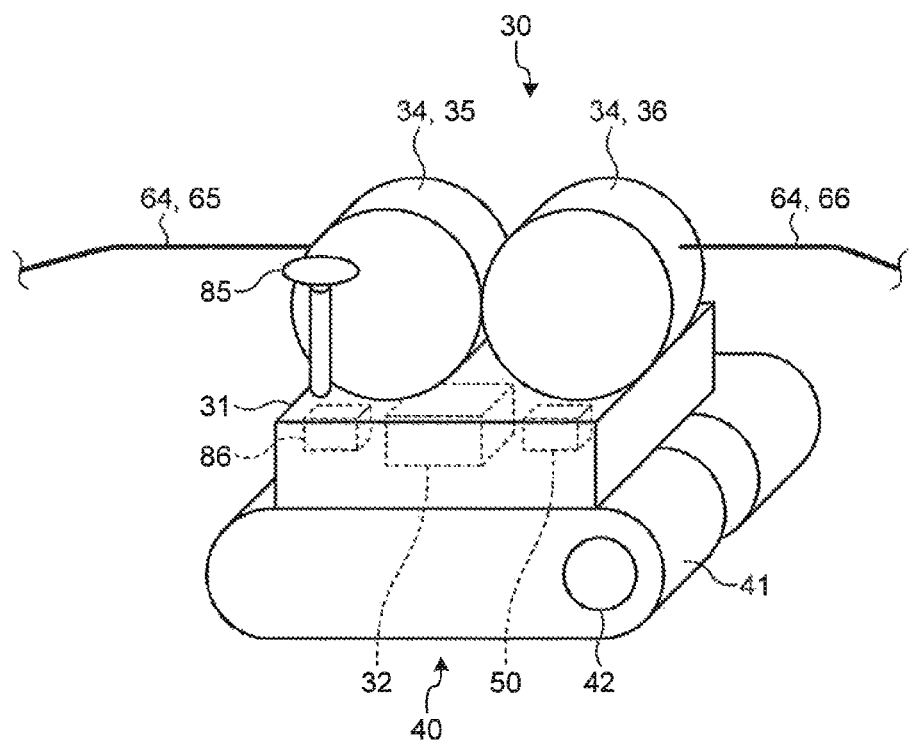
FIG. 8 is an explanatory view illustrating a modified example of the relay truck according to an embodiment.
Figure 9:
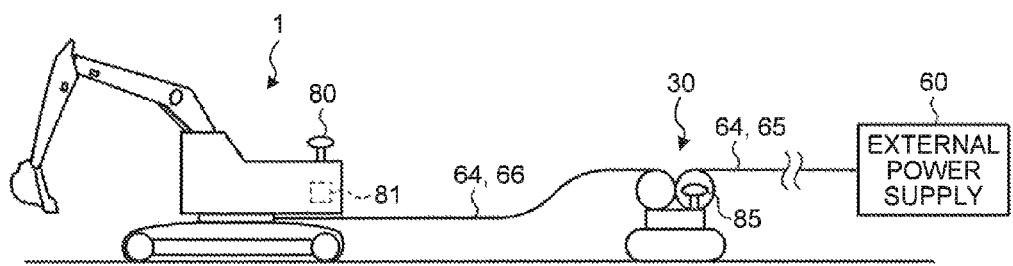
FIG. 9 is an explanatory view illustrating a state in which the relay truck and the excavator illustrated in FIG. 8 are connected to each other by a cable.

Furthermore, the movement control of the relay truck 30 may be performed based on the absolute positional relation between the relay truck 30 and the excavator 1. FIG. 8 is an explanatory view illustrating a modified example of a relay truck according to an embodiment. FIG. 9 is an explanatory view illustrating a state in which a relay truck and an excavator illustrated in FIG. 8 are connected to each other by a cable. In the case in which the movement control of the relay truck 30 is performed based on the absolute positional relation between the relay truck 30 and the excavator 1, for example, as illustrated in FIG. 8, the relay truck 30 is provided with a GPS (Global Positioning System) device 85 serving as a position detector that detects the current position of the relay truck 30. Furthermore, similarly to the excavator 1, as illustrated in FIG. 9, a GPS device 80 serving as a position detector configured to detect the current position of the excavator 1 is provided. Furthermore, the excavator 1 is provided with a transmitter 81 that transmits the positional information of the excavator 1 detected by the GPS device 80, and the relay truck 30 is provided with a positional information receiver 86 that receives the positional information of the excavator 1 transmitted from the transmitter 81.

Thus, in the relay truck 30, since it is possible to obtain the positional information of the excavator 1 by the positional information receiver 86, in addition to the positional information of the relay truck 30 detected by the GPO device 85, it is possible to obtain the absolute positional relation between the relay truck 30 and the excavator 1. For this reason, in the case in which the movement control of the relay truck 30 is performed, by performing the movement control using the movement control unit 51, based on the positional information of the excavator 1 received by the positional information receiver 86 and the current position of the relay truck 30 detected by the GPS device 85, it is possible to more accurately adjust the relative positional relation between the relay truck 30 and the excavator 1. Therefore, when the relay truck 30 is moved, the relay truck 30 can be accurately moved, and when the excavator 1 is moved, it is possible to suppress the tension of the cable 64 from becoming too larger or suppress the cable 64 from being stepped on by the excavator 1. As a result, it is possible to more reliably prevent the damage to the cable 64.

Furthermore, the relay truck 30 described above includes the power supply side drum 35 and the excavator side drum 36 and is able to wind or unwind both the power supply side cable 65 and the excavator side cable 66 around the cable drum 34. However, the cable 64 may be configured so that the both cables cannot be wound around the cable drum 34.

FIG. 10 is an explanatory view illustrating a modified example of a relay truck according to an embodiment. As illustrated in FIG. 10, only one cable drum 34 is provided in the relay truck 30, and only one of the power supply side cable 65 and the excavator side cable 66 may be provided so that it can wound and unwound around the cable drum 34. For example, in the case in which the excavator side cable 66 is allowed to be wound around the cable drum 34, the end portion of the excavator side cable 66 wound around the cable drum 34 is connected to the power transmission relay unit 32, and the power supply side cable 65 may be directly connected to the power transmission relay unit 32 without being wound around the cable drum 34. The relay truck 30 is interposed between the external power supply 60 and the excavator 1, and in the case in which the length of the cable 64 is adjusted in accordance with the movement of the excavator 1, even simply by adjusting the length of one of the power supply side cable 65 and the excavator side cable 66, it is possible to suppress the tension of the cable 64 from becoming too larger. Thus, the cable 64 may be provided so that at least one of the power supply side cable 65 and the excavator side cable 66 is wound around the cable drum 34 in an insertable and drawable manner. Thus, since it is possible to suppress the tension of the cable 64 from becoming too larger, the damage to the cable 64 can be prevented.

Furthermore, in the relay truck 30 described above, although the camera 38 is used as an external state detection unit to detect the surrounding states, anything other than the camera 38 may be used as the external state detection unit, for example, such as using a laser sensor for detecting the surrounding states by the reflected wave by irradiating the outside with a laser beam.

Furthermore, in the relay truck 30 described above, although the camera 38 is provided in the relay truck 30, the detection unit such as the camera 38 may be provided in the excavator 1. In the case of detecting a relative relation between the excavator 1 and the relay truck 30, since the detection unit can also be provided in the excavator 1 to detect the relative relation, the detection unit such as the camera 38 or the laser sensor may be provided on the excavator 1 side. In this case, in the case of moving the relay truck 30, the movement control of the relay truck 30 is performed, by transmitting the detection result of the excavator 1 side using the detection unit to the relay truck 30 by a communication unit using radio waves or the like.

In this manner, since the movement control of the relay truck 30 can be performed by obtaining the relative positional relation between the relay truck 30 and the excavator 1, the acquisition of the relative positional relation may be performed by the suitable combination of the above-mentioned methods or by the use of a method other than the above-mentioned methods.

Furthermore, although the electric work machine configured to supply electricity via the relay truck 30 described above is described, as one example, using the remote-controlled excavator 1, the electric work machine may be anything other than this type. For example, the electric work machine may be an excavator on which a driver boards the excavator to perform the driving operation or a work machine other than the excavator. As long as the electric work machine is actuated by electricity supplied from the external power supply 60 and moves in the state in which the cable 64 is connected thereto, the form thereof is not limited.

REFERENCE SIGNS LIST

1 EXCAVATOR
2 UPPER SWING BODY
8 PUMP UNIT
10 LOWER TRAVELING BODY
11, 41 CRAWLER BELT
12, 42 TRAVEL MOTOR
16 SWING CIRCLE
30 RELAY TRUCK
31 TRUCK MAIN BODY
32 POWER TRANSMISSION RELAY UNIT
34 CABLE DRUM
35 POWER SUPPLY SIDE DRUM
36 EXCAVATOR SIDE DRUM
38 CAMERA
40 TRAVEL DEVICE
50 ELECTRONIC CONTROL DEVICE
51 MOVEMENT CONTROL UNIT
52 MOVEMENT POSITION DERIVATION UNIT
53 DRUM CONTROL UNIT
60 EXTERNAL POWER SUPPLY
64 CABLE
65 POWER SUPPLY SIDE CABLE
66 EXCAVATOR SIDE CABLE
70 CONTROL RECEIVER
80, 85 GPS DEVICE
81 TRANSMITTER
86 POSITION INFORMATION RECEIVER

The invention claimed is:

1. A self-propelled cable relay truck comprising:
a power transmission relay unit to which a power supply side cable configured to perform power transmission between a power supply and the relay truck, and a work machine side cable configured to perform power transmission between an electric work machine and the relay truck are connected to perform relay of the power transmission between the power supply side cable and the work machine side cable;
a travel device configured to perform traveling operation by electricity supplied from the power supply with the power supply side cable so as to be able to move the power transmission relay unit;
an external state detection unit configured to detect a surrounding state; and
a movement control unit configured to perform movement control of the travel device based on a detection result by the external state detection unit, so as not to move the travel device on the work machine side cable which is on the ground while maintaining a relative position between the travel device and the electric work machine.

2. The self-propelled cable relay truck according to claim 1, further comprising:
a movement position derivation unit configured to derive a movement position based on a position of the electric work machine,
wherein the movement position derivation unit is configured to derive the movement position based on a position of the electric work machine detected by the external state detection unit, and
the movement control unit is configured to perform the movement control so as to move to the movement position derived by the movement position derivation unit.

3. The self-propelled cable relay truck according to claim 1, further comprising:
a control receiver configured to receive a control signal from an outside,
wherein the movement control unit is configured to perform the movement control based on the control signal received by the control receiver.

4. The self-propelled cable relay truck according to claim 1, further comprising:
a position detector configured to detect a current position; and
a positional information receiver configured to receive position information of the electric work machine transmitted from a transmitter provided in the electric work machine,
wherein the movement control unit is configured to perform the movement control based on the position information of the electric work machine received by the positional information receiver and the current position detected by the position detector.

5. The self-propelled cable relay truck according to claim 1, further comprising:
   a winding device configured to be capable of winding a cable,
   wherein at least one of the power supply side cable and the work machine side cable is wound by the winding device in an insertable and drawable manner.

6. The self-propelled cable relay truck according to claim 1, wherein
   the external state detection unit detects a position of the electric work machine,
   the self-propelled cable relay truck further comprises a movement position derivation unit deriving a movement position based on the position of the electric work machine, and
   the movement control unit performs the movement control of the travel device based on a distance between the electric work machine and the relay truck, and a position of the work machine side cable, so as to move the relay truck to the movement position derived by the movement position derivation unit, and so as not to move the relay truck on the work machine side cable while maintaining the distance between the electric work machine and the relay truck.

\* \* \* \* \*